May 20, 1952  M. VAN HILSON  2,596,998
VEHICLE BRAKE AND THROTTLE OPERATING MECHANISM
Filed Oct. 6, 1950  4 Sheets-Sheet 1

INVENTOR.
MARION V. HILSON
BY
McMorrow, Berman & Davidson
ATTORNEYS

May 20, 1952 M. VAN HILSON 2,596,998
VEHICLE BRAKE AND THROTTLE OPERATING MECHANISM
Filed Oct. 6, 1950 4 Sheets-Sheet 2
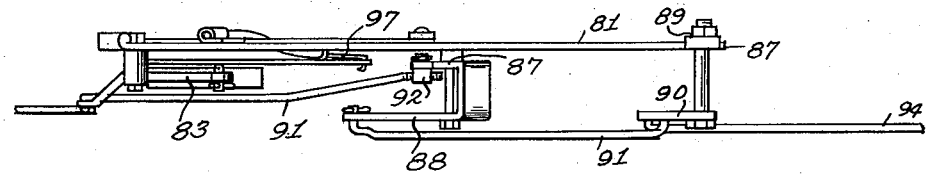
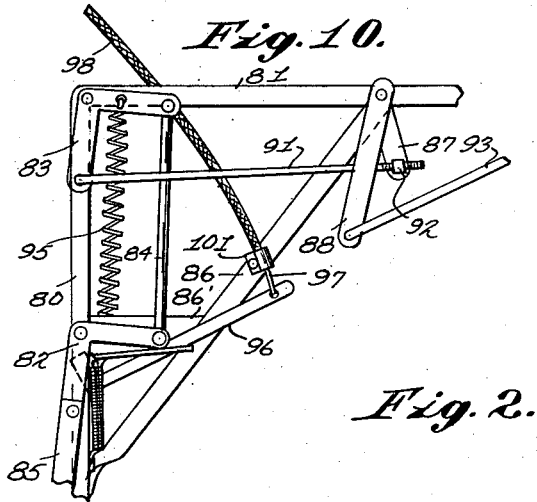
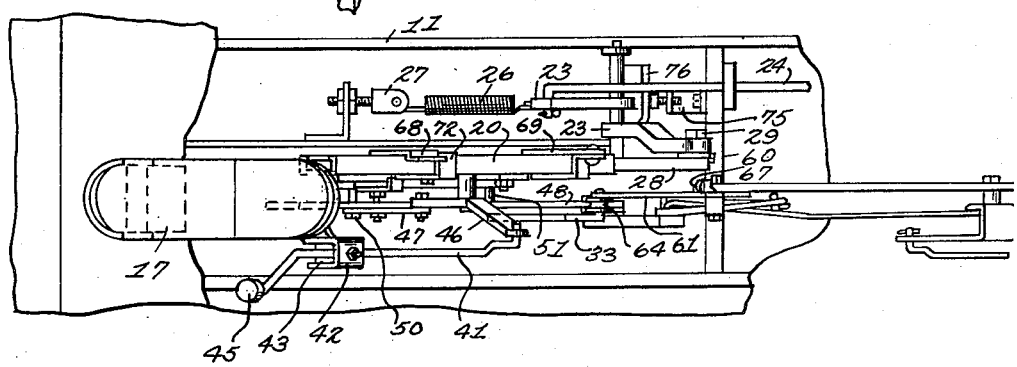
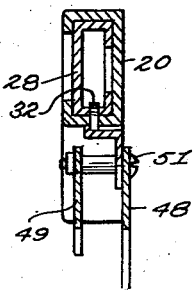
INVENTOR
MARION V. HILSON
BY
McMorrow, Berman & Davidson
ATTORNEY May 20, 1952  M. VAN HILSON  2,596,998
VEHICLE BRAKE AND THROTTLE OPERATING MECHANISM
Filed Oct. 6, 1950  4 Sheets-Sheet 3

INVENTOR
MARION V. HILSON
BY
McMorrow, Berman & Davidson
ATTORNEY

May 20, 1952  M. VAN HILSON  2,596,998
VEHICLE BRAKE AND THROTTLE OPERATING MECHANISM
Filed Oct. 6, 1950  4 Sheets-Sheet 4
*Fig. 5.*
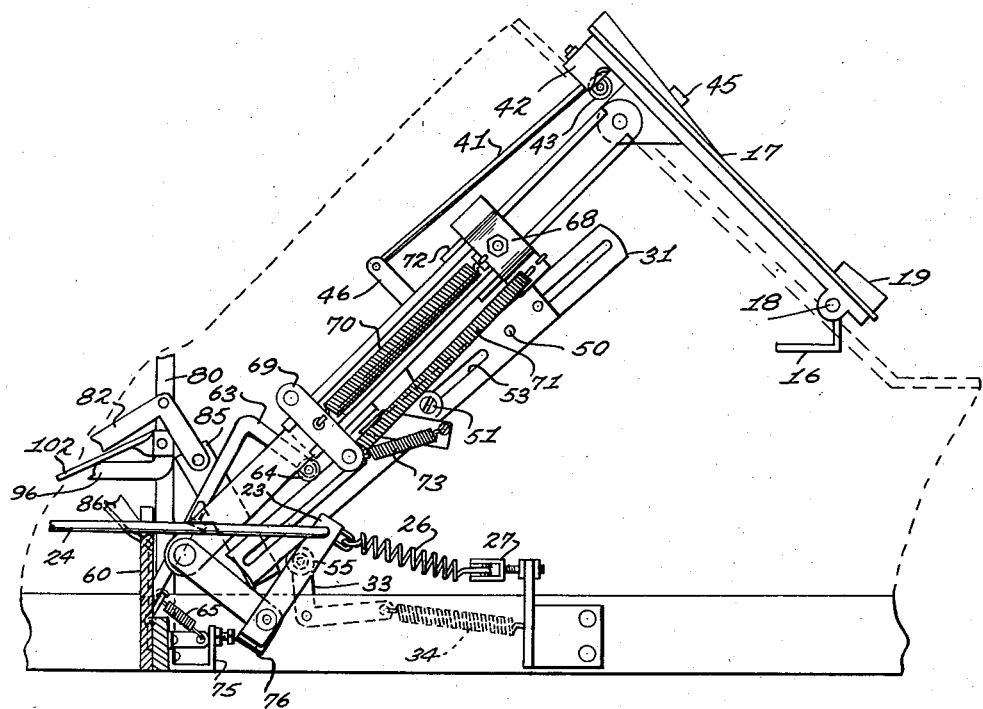
*Fig. 6.*  *Fig. 7.*
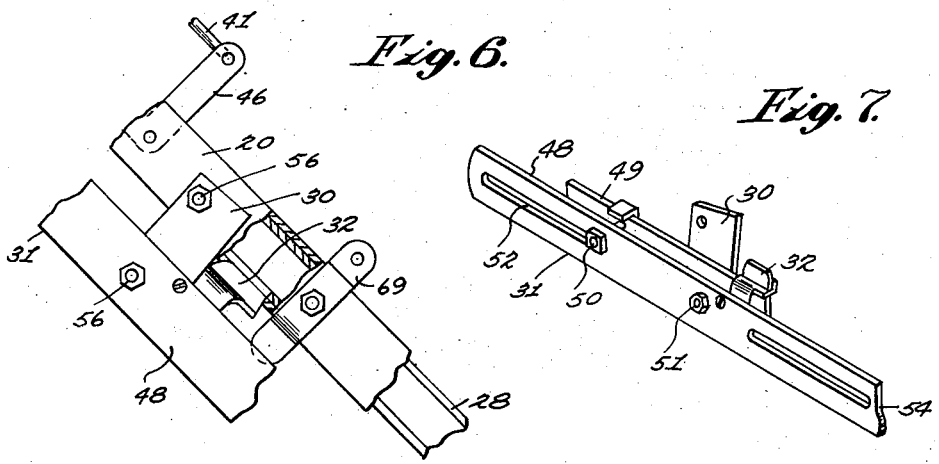
INVENTOR
MARION V. HILSON
BY
McMorrow, Berman & Davidson
ATTORNEY Patented May 20, 1952

2,596,998

UNITED STATES PATENT OFFICE 2,596,998

VEHICLE BRAKE AND THROTTLE OPERATING MECHANISM

Marion Van Hilson, Lockland, Ohio

Application October 6, 1950, Serial No. 188,834

5 Claims. (Cl. 192—3)

This invention relates to manually operated vehicle control means and more particularly to a combined manually operated mechanism for operating the brakes and throttle of an automotive vehicle.

It is among the objects of the invention to provide combined control mechanism for the brakes and throttle of an automotive vehicle which enables the vehicle operator to control both the throttle and the brakes by a single pedal and without removing his foot from such pedal, which selectively connects the pedal with the brakes or the throttle under operator control and provides a smooth and effective control for both the throttle and the brakes of the vehicle, which is simple and durable in construction and can be installed on an existing vehicle with no material modification of the vehicle construction, and which is positive and effective in operation and easy to use.

Other objects and advantages will become apparent from a consideration of the following description and the appended claims in conjunction with the accompanying drawings wherein:

Figure 2 is a top plan view of a portion of the control means illustrated in Figure 1;

Figure 5 is a view similar to Figure 3 but showing the parts in a different operative position from that illustrated in Figure 3;

Figure 6 is a side elevational view on an enlarged scale of a fragmentary portion of the mechanism illustrated in Figure 4;

Figure 7 is a perspective view of an operative component of the mechanism;

Figure 8 is a transverse cross sectional view on the line 8—8 of Figure 4;

Figure 9 is a top plan view of another portion of the mechanism illustrated in Figure 1; and Figure 10 is a side elevational view of the portion of the mechanism illustrated in Figure 1 with the parts in a different operative position from that illustrated in Figure 1.

Figure 1:
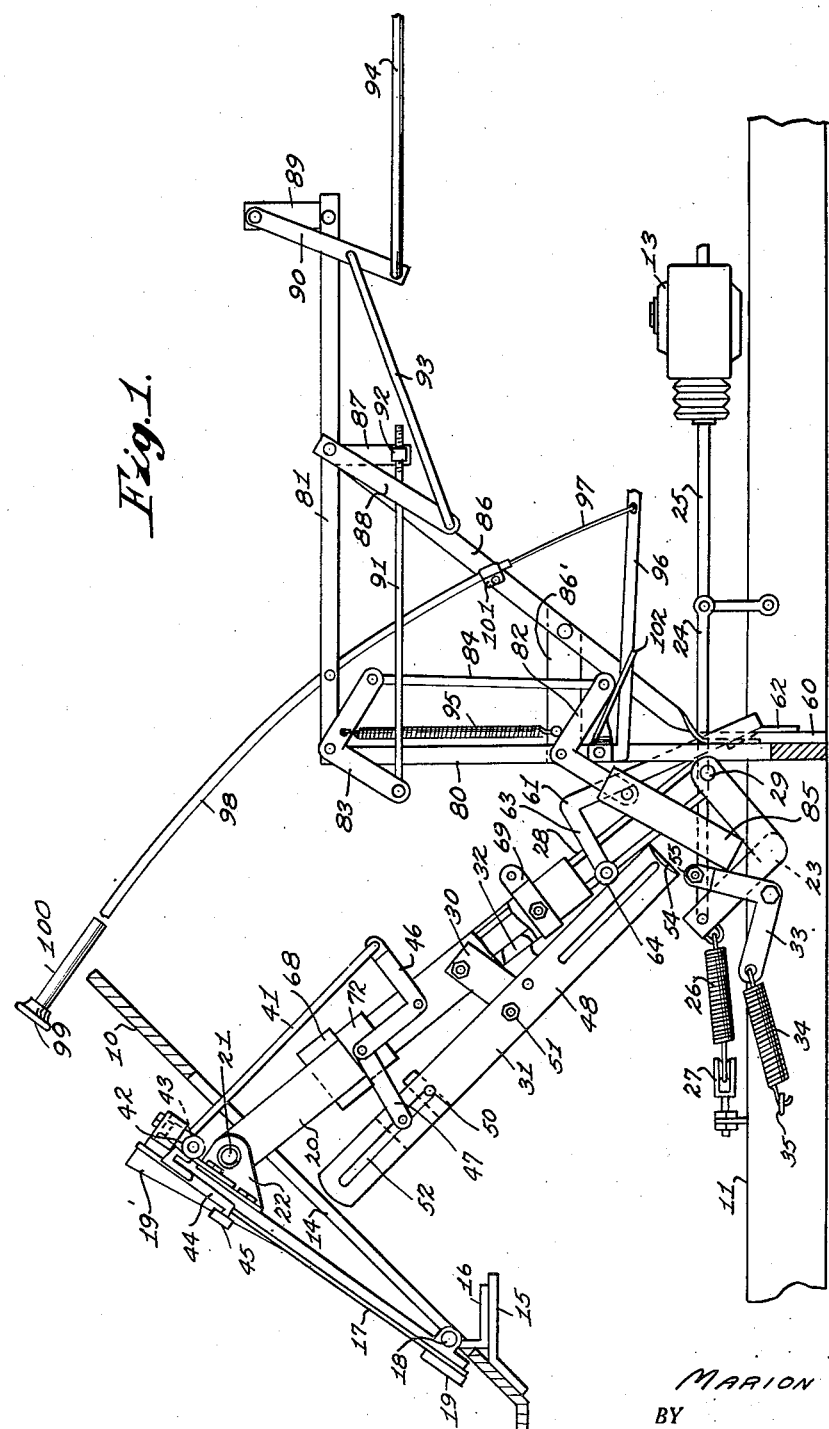
Figure 1 is a somewhat diagrammatic side elevational view of brake and throttle control means illustrative of the invention.
Figure 3:
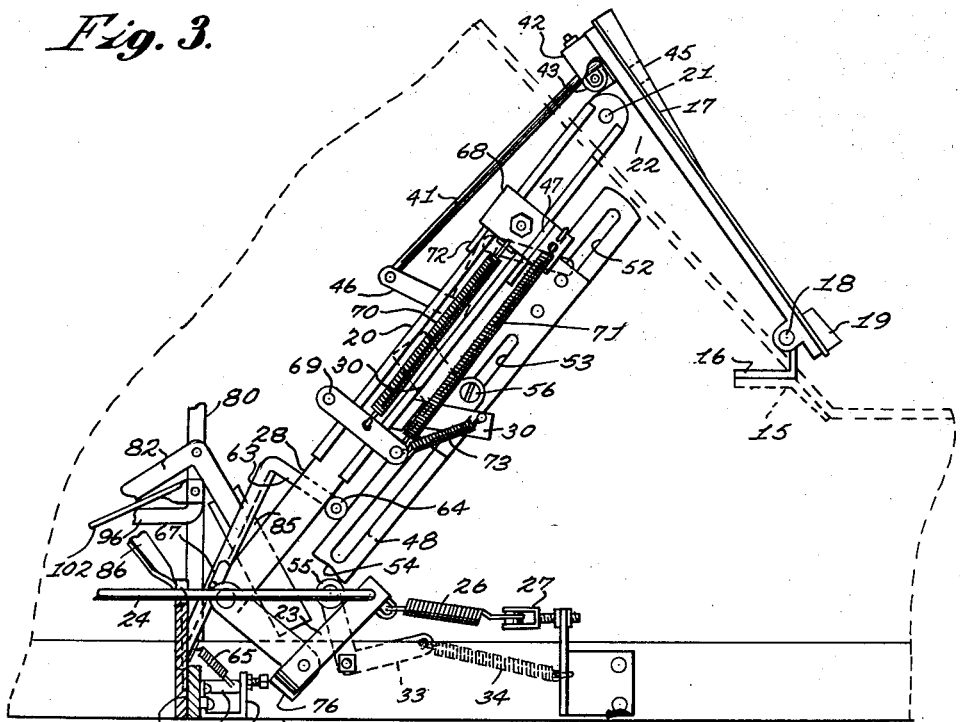
Figure 3 is a side elevational view of the portion of the control means illustrated in Figure 2.
Figure 4:
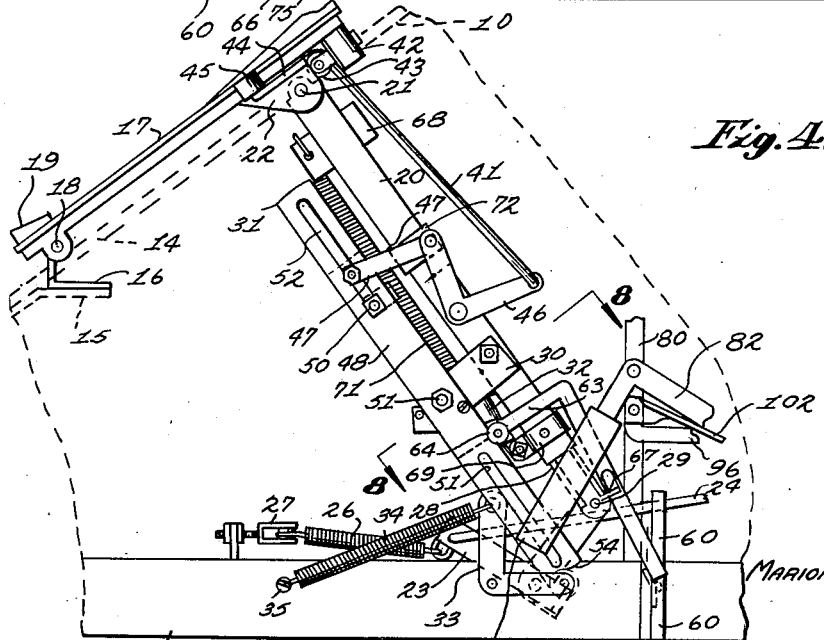
Figure 4 is a side elevational view of the opposite side of the control means from that illustrated in Figure 3.

With continued reference to the drawings, in Figure 1 the brake and throttle control mechanism is shown operatively mounted in an automotive vehicle having a footboard structure 10, a frame member 11, an engine throttle link 12 and a brake member cylinder 13.

The footboard structure 10 is provided with an elongated opening 14 and a fixed bracket 15 is secured to the under side of the footboard structure at the lower end of the opening 14. A hinge butt 16 is secured to the bracket 15 and projects through the opening 14 and an elongated foot pedal 17 is pivotally secured at one end to the hinge butt 16 by a hinge pin 18, which extends through the eye of the hinge butt and through a pair of apertured lugs on the foot pedal which lugs are disposed one at each opposite side of the hinge butt. A heel rest 19 is carried on the foot pedal 17 at the hinged end of the latter and a toe pad 19' is provided on the other end of the footrest.

An elongated bar 20 of generally rectangular cross sectional shape and having a bore of rectangular cross sectional shape extending therethrough is pivotally connected at one end to the foot pedal 17 near the free end of the latter by a pivot pin 21 which extends through an aperture in the bar 20 and through a registering aperture in an ear 22 secured to the under side of the pedal 17.

A bell crank lever 23 is pivotally mounted at its angle on the frame member 11 and has one end connected through a connecting rod 24 with the piston rod 25 of the brake master cylinder 13. A tension spring 26 is connected between this end of the bell crank 23 and a spring clip 27 secured to the frame member 11 for resiliently moving the bell crank in a direction to retract the piston rod of the brake master cylinder after the latter has been advanced to apply the brakes.

A second bar 28, also of generally rectangular cross sectional shape, is telescopically and slidably received in the bore of the first bar 20 and this second bar 28 is pivotally connected at one end to the other end of the bell crank 23 by a pivot pin or bolt 29.

An arm 30 is pivotally connected at one end to the bar 29 and projects laterally from this bar and an elongated lever 31 is secured intermediate its length to the arm 30 and extends along the bars 20 and 28.

The bars 20 and 28 are provided with registrable apertures in the overlapping portions thereof and a latch tongue 32 carried by the lever 31 adjacent the arm 30 is insertable into these apertures to lock the bars 20 and 28 against longitudinal movement relative to each other when the lever is in its brake operating position, as illustrated in Figure 1.

With the bars 20 and 28 interconnected by the latch tongue 32, when the free end of the foot pedal 17 is depressed the bell crank 23 is rocked about its pivotal mounting on the frame member 11 to force the master cylinder piston rod 25 inwardly of the master cylinder and apply the vehicle brakes.

A second bell crank 33 is pivotally mounted at its angle on the frame member 11 and a tension spring 34 is pivotally connected at one end to one end of this second bell crank and at its opposite end to the frame member 11 by a clip or eye 35.

A plunger 41 is slidably mounted on the foot pedal 17 at the free end of the latter by a clip 42 which is secured to the under side of the foot pedal and through which the plunger extends and a roller 43 carried by the clip bears against the plunger. At its end adjacent the foot pedal the plunger is provided with an angular offset portion 44 and a foot contacting button 45 is mounted on the end of this offset so that the plunger can be moved longitudinally relative to the bar 20. A bell crank 46 is pivotally mounted at its angle on the bar 20 and pivotally connected at one end to the adjacent end of the plunger 41. The opposite end of this bell crank is connected through a link 47 with the lever 31.

The lever 31 is a built up structure comprising a flat outer bar 48 and a flat inner bar 49 spaced from and substantially parallel to the bar 48. The bar 49 is shorter than the bar 48 and carries at one end the latch dog 32 for locking the tubular bars 20 and 28 together. This bar 49 is secured to the bar 48 by bolts 50 and 51, suitable spacers surrounding these bolts between the two bars. The bolt 50 is received in a slot 52 in the lever bar 48 and the bolt 51 is received in a corresponding slot 53 in the lever bar 49 so that the bar 48 is longitudinally adjustable relative to the bar 49 and to the arm 30 which is attached to the bar 49. At its end remote from the pedal 17 the outer lever bar 48 has a concavely curved end surface 54 which contacts a grooved roller 55 carried by the bell crank 33 at the end of the latter remote from spring 34.

When the plunger 41 is depressed by foot pressure on the button 45 the lever 31 is rocked about the pivotal connection 56 between the arm 30 and bar 20 so that the latch dog 32 is withdrawn from the openings in the brake operating bars 20 and 28 and the end of the lever bar 48 is brought into alignment with the roller 55. If the foot pedal 17 is depressed under these conditions the bar 20 will slide along the bar 28 and the brakes will not be actuated but pressure of the lever bar 48 on the adjacent end of the bell crank 33 will rock this bell crank lever.

A bracket 60 is mounted on the vehicle frame member 11 near the bell crank 23 and an arm 61 is pivotally mounted at one end on this bracket by a hinge structure 62. At its opposite end the arm 61 has an offset portion 63 and a grooved roller 64 rotatably mounted on the distal end of the offset portion 63 rides on the adjacent surface of the bar 48 of the lever 31. A tension spring 65 connected between the arm adjacent the hinge 62 and an ear 66 carried by the bracket 60 swings the arm 61 in a direction to maintain the roller 64 under pressure on the adjacent surface of the lever bar 48. The arm 61 carries a stop 67 intermediate its length which stop is positioned to engage the end of the bar 28 connected to the bell crank 23 when the lever 31 is in its throttle operating position. The stop 67 holds the bar 20 against longitudinal movement when the pedal 17 is depressed with the lever 31 in throttle operating position so that the bar 28 will not be moved to apply the brakes under these conditions.

A spring clip 68 is secured to the bar 28 at the end of the latter adjacent the pedal 17 and a complementary clip 69 is secured to the bar 20 near the end of the latter remote from the pedal. Two tension springs 70 and 71 are connected between the clips 68 and 69 and resiliently urge the bar 20 longitudinally of the bar 28 in a direction to raise the pedal 17. A stop 72 secured on the bar 20 engages the spring clip 68 to limit the spring induced, relative movement of the bars 20 and 28 in a pedal lifting direction.

With this arrangement, when the pedal 17 and plunger 41 are simultaneously depressed, the bar 28 will be held against movement by the stop 67 and the bar 20 will slide on the bar 28 stretching the springs 70 and 71. The lever 38 will be moved by depression of the plunger 41 to engage the roller 55 and rock the bell crank 33 about its pivotal mounting on frame 11, stretching spring 34. Depression of the plunger 41 also stretches a spring 73 connected between the outer end of the arm 30 and the spring clip 69. Now, when the pressure on the pedal 17 is released, the spring 70 and 71 will move the bar 20 relative to the bar 28 until the stop 72 contacts the upper spring clip 68 thereby raising the pedal and retracting the lever 31. When the pressure of the lever 31 on roller 55 is released, spring 34 moves the bell crank 33 in a direction to close the throttle 12. When the pedal has reached its fully raised position and pressure on the plunger 41 is released, the spring 73 swings the arm 30 to move the lever 31 away from its throttle operating position, and to engage the latch dog 32 in the registering apertures in the bars 20 and 28. If the pedal 17 is now depressed without depressing the plunger knob 45, the bars 20 and 28 will be moved together to turn the bell crank 23 and apply the vehicle brakes. Under these conditions, the lever 31 will move with the bars 20 and 28 but will miss the roller 55 so that the throttle will remain closed. When the brake applying pressure on the pedal 17 is now released, the spring 26 which was stretched during the application of the brakes, will rotate the bell crank 23 to return the pedal to its raised position.

An adjustable stop 75 carried by the bracket 60 engages an offset 76 on the bell crank 23 to limit the pedal raising movement of the bars 20 and 28 under the influence of the spring 26.

With the above described arrangement, when it is desired to control the vehicle throttle, the pedal 17 and plunger button 45 are simultaneously depressed and when it is desired to close the throttle and apply the vehicle brakes, the pressure on the pedal 17 is first released allowing the pedal to rise to its uppermost position and then the pedal alone is depressed without depressing the plunger button 45 whereupon the mechanism will apply the brakes while leaving the throttle closed.

As is particularly illustrated in Figures 1, 9 and 10, a post 80 is secured to the frame 11 adjacent the bracket 60 and extends upwardy from the frame substantially perpendicular thereto. A rigid bar 81 is secured at one end to the upper end of the post 80 and projects perpendicularly from the post 80 in a direction forwardly of the vehicle upon which the mechanism is mounted.

A bell crank lever 82 is pivotally mounted at its angle on the post 80 intermediate the length of this post and a similar bell crank lever 83 is pivotally mounted at its angle on the post 81 at the upper end of the latter. A link 84 connects one end of the bell crank lever 82 to one end of the bell crank lever 83 so that the two levers will rock simultaneously about their pivotal connections with the post 80. An extension 85 is secured on the other end of the bell crank lever 82 and extends into the path of the end of the bell crank lever 33 carrying the roller 55 so that, when the bell crank lever 33 is rocked about its pivotal mounting on the frame 11 by depressing both the pedal 17 and the plunger button 45, as described above, the two bell crank levers 82 and 83 will be coextensively rocked about their pivotal connections with the post 80.

A diagonal brace 86 extends from the post 80 near the bracket 60 to the bar 61 intermediate the length of the bar and assists in supporting the bar in its perpendicular relationship to the post 80. Other supporting means for the post and the bar may be provided as may be found necessary or desirable.

A simple lever 87 is pivotally mounted at one end on the bar 81 at the bar adjacent end of the brace 86 and a second simple lever 88 is also pivotally mounted on the bar 81 at this location and projects from the bar in the same direction as the lever 87. The levers 87 and 88 are connected together at their pivotally mounted ends so that they rock simultaneously about their pivotal mounting on the bar 81.

A bracket 89 projects upwardly from the bar 81 at the end of this bar remote from the post 80 and a third simple lever 90 is pivotally connected at one end to the bracket 89 near the upper end of the latter and depends from this pivotal connection past the bar 81. A link 91 connects the end of the bell crank lever 83 remote from the link 84 to the distal end of the lever 87, being adjustably connected to the lever 87 by means of a nut 92 pivotally connected to the lever and receiving a screw threaded end portion of the link 91. A link 93 pivotally connects the distal end of lever 88 to lever 90 intermediate the length of the latter and a throttle rod 94 is pivotally connected to the distal end of lever 90 and extends therefrom to a connection with the vehicle throttle valve, not illustrated.

A tension spring 95 connected between the bell crank lever 83 and a secondary brace 96 connected between the post 80 and the diagonal brace 86 resiliently resists the movement imparted to the bell cranks 82 and 83 by the bell crank lever 33 and moves the throttle operating linkage in a throttle closing direction when pressure exerted on the bell crank extension 85 by the bell crank lever 33 is released.

By means of the linkage mechanism just described, the throttle operating movements of the bell crank lever 33 are transmitted to the throttle rod 94; the lever 87 being shorter than the lever 88 and the connection between the link 93 and lever 90 being nearer the pivotal axis of the lever 90 than the connection between the throttle rod 94 and this lever so that the movement reducing connection between the bell crank lever 33 and the bell crank lever 82 is suitably compensated by the throttle operating linkage.

A lever 96 is pivotally mounted at one end on the post 80 below and adjacent to the pivotal connection between the post and the bell crank lever 82. The core 97 of a Bowden wire is connected at one end to the distal end of the lever 96 and extends through a flexible sheath 98 to a pull knob 99, the end of the sheath remote from the lever 96 being mounted in the vehicle instrument board by a suitable thimble 100. The other end of the sheath 98 is connected to the diagonal brace 86 by a clip 101 so that movement of the core 97 longitudinally of the sheath 98 by the knob 99 will swing the lever 96 about its pivotal connection with the post 80. A flat arm 102 connected at one end to the lever 96 at the pivotally mounted end of the latter underlies the end of bell crank lever 82 to which the link 84 is connected.

With the above construction, when the knob 99 is pulled outwardly the distal end of the lever 96 is raised, raising the end of the bell crank lever 82 contacted by the flat arm 102 and advancing the engine throttle through the linkage mechanism including the link 84, the bell crank lever 83, the link 91, the levers 87 and 88, the link 93, and the lever 90. The lever 96, Bowden wire core and sheath 97 and 98 and hand knob 99 thus constitutes a manual control for the vehicle throttle which is independent of the foot operated combined throttle and brake control mechanism.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Combined brake and throttle control mechanism for an automotive vehicle comprising a foot pedal, means pivotally connecting said pedal at one end to a fixed support, a first bar pivotally connected at one end to said pedal near the free end of the latter, a pivotally mounted first bell crank, means connecting one end of said first bell crank to vehicle brake mechanism, a second bar pivotally connected at one end to the other end of said first bell crank and slidably associated with said first bar, latch means carried by said first bar and engaging said second bar for interlocking said first and second bars to operate the vehicle brake means when the free end of said pedal is depressed, a lever pivotally mounted on said first bar and connected to said latch means for disconnecting said first and second bars, a foot engageable plunger carried on said first bar and connected to said lever for moving the latter to disconnect said first and second bars when said plunger is depressed, a second pivotally mounted bell crank, means connecting one end of said second bell crank to the vehicle throttle, a tension spring connected to the other end of said second bell crank, said one end of said second bell crank being disposed in the path of the adjacent end of said lever when the latter is in its bar releasing position for operation of the vehicle throttle by said pedal when said plunger is depressed.

2. Combined brake and throttle control mechanism for an automotive vehicle comprising a foot pedal, means pivotally connecting said pedal at one end to a fixed support, a first bar pivotally connected at one end to said pedal near the free end of the latter, a pivotally mounted first bell crank, means connecting one end of said first bell crank to vehicle brake mechanism, a second bar pivotally connected at one end to the other end of said first bell crank and slidably associated with said first bar, latch means carried by said first bar and engaging said second bar for interlocking said first and second bars to operate the vehicle brake means when the free end of said pedal is depressed, a lever pivotally mounted on said first bar and connected to said latch means for disconnecting said first and second bars, a foot operated plunger carried on said first bar and connected to said lever for moving the latter to disconnect said first and second bars when said plunger is depressed, a second pivotally mounted bell crank, means connecting one end of said second bell crank to the vehicle throttle, and a tension spring connected to the other end of said second bell crank, said means connecting said second bell crank to said throttle comprising a vehicle carried post, a bar secured at one end to one end of said post and extending from the latter, bell crank levers pivotally mounted on said post in spaced apart relationship, a link interconnecting the post carried bell cranks for simultaneous movement, an extension on one of said post carried bell crank levers engaged by said second bell crank for rocking said post carried bell crank levers about their pivotal connections with said posts, a throttle rod, link and lever mechanism mounted on said bar and connecting the other of said post carried bell crank levers to said throttle rod, a lever pivotally mounted at one end on said post and engaging one of said post carried bell crank levers, and hand operated means connected to said lever engaging one of said bell crank levers for hand adjustment of the vehicle throttle.

3. Combined vehicle throttle and brake control mechanism comprising a foot operated pedal pivotally supported at one end, a pivotally supported brake operating lever, a pivotally supported throttle operating lever, longitudinally collapsible means connecting the free end of said pedal to said brake operating lever, spring means carried by said longitudinally collapsible means resiliently urging the latter to expanded condition, stop means limiting the spring induced expansion of said collapsible means, a lever pivotally mounted on said collapsible means, latch means carried by said lever and engageable with said longitudinally collapsible means to lock the latter against longitudinal collapse, said lever having two operative positions in one of which it engages said latch means with said collapsible means to preclude collapse of the latter when said pedal is depressed and in the other of which it disengages said latch means from said collapsible means and engages said throttle operating lever, a plunger carried by said pedal and connected to said lever mounted on said longitudinally collapsible means for moving the last mentioned lever from said one to said other operative position when said plunger is depressed, spring means connected between said last mentioned lever and said longitudinally collapsible means for returning said last mentioned lever from said other to said one operative position when said plunger is released, and stop means operated by said last mentioned lever to hold said brake operating lever against brake applying movement when said last mentioned lever is in said other operative position.

4. Combined vehicle throttle and brake control mechanism comprising a foot operated pedal pivotally supported at one end, a pivotally supported brake operating lever, a pivotally supported throttle operating lever, longitudinally collapsible means connecting the free end of said pedal to said brake operating lever, spring means carried by said longitudinally collapsible means resiliently urging the latter to expanded condition, stop means limiting the spring induced expansion of said collapsible means, a lever pivotally mounted on said collapsible means, latch means carried by said lever and engageable with said longitudinally collapsible means to lock the latter against longitudinal collapse, said lever having two operative positions in one of which it engages said latch means with said collapsible means to preclude collapse of the latter when said pedal is depressed and in the other of which it disengages said latch means from said collapsible means and engages said throttle operating lever, a plunger carried by said pedal and connected to said lever mounted on said longitudinally collapsible means for moving the last mentioned lever from said one to said other operative position when said plunger is depressed, spring means connected between said last mentioned lever and said longitudinally collapsible means for returning said last mentioned lever from said other to said one operative position when said plunger is released, stop means operated by said last mentioned lever to hold said brake operating lever against brake applying movement when said last mentioned lever is in said other operative position, spring means connected to said throttle operating lever for returning the latter from movement thereof by said last mentioned lever, spring means connected to said brake operating lever for returning the latter from movement thereof by said longitudinally collapsible means, and adjustable stop means limiting movement of said brake operating lever by the last mentioned spring means.

5. Combined vehicle throttle and brake control mechanism comprising a foot operated pedal pivotally supported at one end, a pivotally supported brake operating lever, a pivotally supported throttle operating lever, longitudinally collapsible means connecting the free end of said pedal to said brake operating lever, spring means carried by said longitudinally collapsible means resiliently urging the latter to expanded condition, stop means limiting the spring induced expansion of said collapsible means, a lever pivotally mounted on said collapsible means, latch means carried by said lever and engageable with said longitudinally collapsible means to lock the latter against longitudinal collapse, said lever having two operative positions in one of which it engages said latch means with said collapsible means to preclude collapse of the latter when said pedal is depressed and in the other of which it disengages said latch means from said collapsible means and engages said throttle operating lever, a plunger carried by said pedal and connected to said lever mounted on said longitudinally collapsible means for moving the last mentioned lever from said one to said other operative position when said plunger is depressed, spring means connected between said last mentioned lever and said longitudinally collapsible means for returning said last mentioned lever from said other to said one operative position when said plunger is released, and stop means operated by said last mentioned lever to hold said brake operating lever against brake applying movement when said last mentioned lever is in said other operative position, said longitudinally collapsible means comprising a first elongated bar having a bore extending longitudinally therethrough and a latch receiving opening therein, and a second elongated bar slidably received in the bore of said first bar and having therein a latch receiving opening registering with the latch receiving opening in said first bar when said collapsible means is in expanded condition.

MARION VAN HILSON.

REFERENCES CITED

The following references are of record in the file of this patent:

UNITED STATES PATENTS

| Number | Name | Date |
|---|---|---|
| 2,081,126 | Dausmann | May 18, 1937 |
| 2,321,614 | Palmer | June 15, 1943 |
| 2,411,167 | Perry | Nov. 19, 1946 |